Feb. 1, 1949.  G. A. RILEY  2,460,768
BASIN PLUG STOPPER OR THE LIKE
Filed Oct. 17, 1946
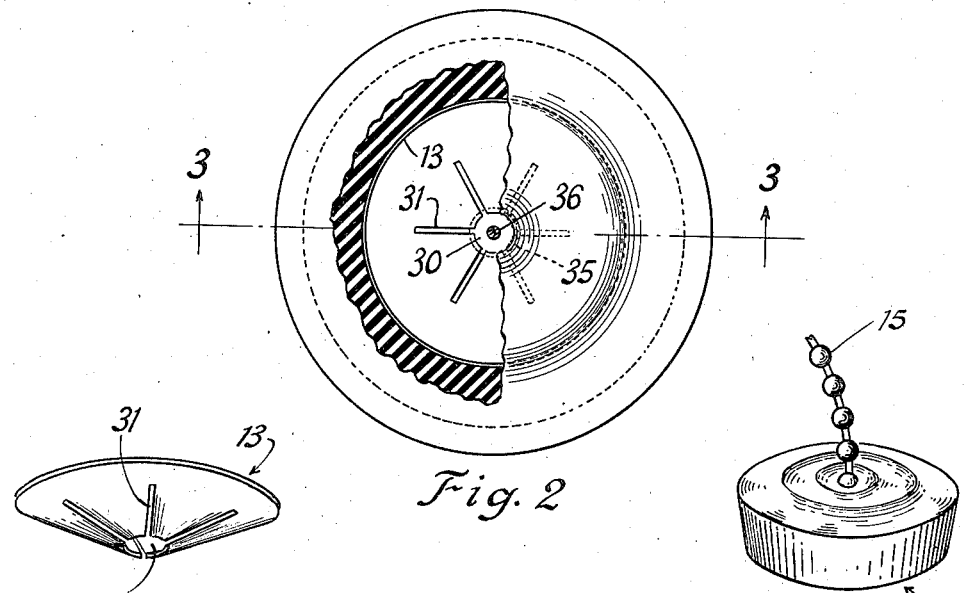
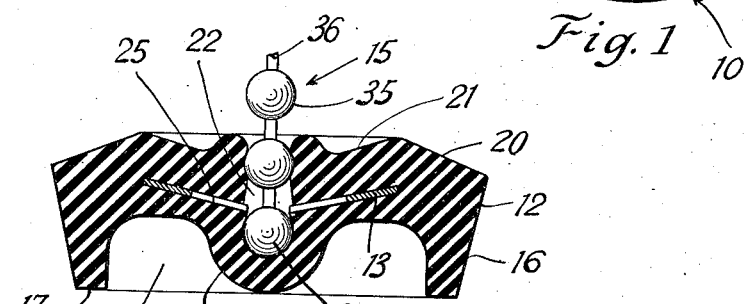
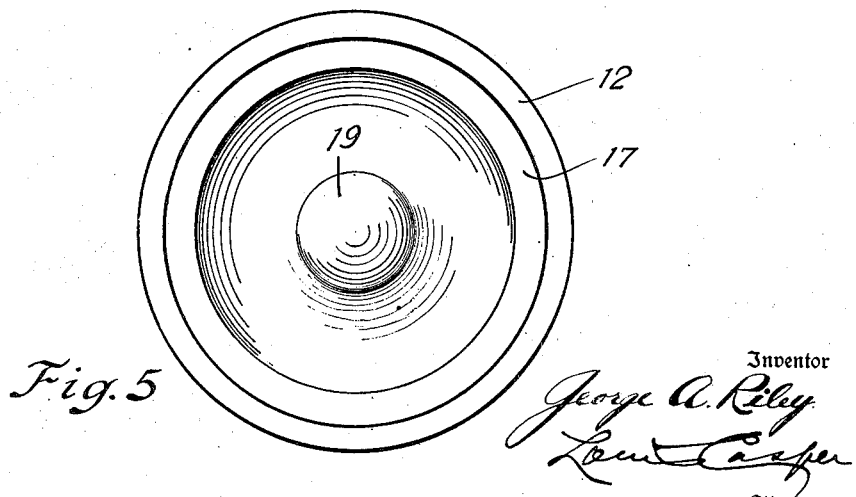
Inventor
George A. Riley
Attorney Patented Feb. 1, 1949

2,460,768

UNITED STATES PATENT OFFICE 2,460,768

BASIN PLUG STOPPER OR THE LIKE

George A. Riley, Bridgeport, Conn., assignor to H. O. Canfield Co., Bridgeport, Conn., a corporation of Connecticut Application October 17, 1946, Serial No. 703,725

6 Claims. (Cl. 4—295)

This invention relates to stoppers. It is particularly directed to a basin plug or stopper provided with a chain anchored thereto.

An object of this invention is to provide a stopper of the character described which is completely leak-proof, and which comprises a molded body entirely closed or imperforate at its underside, and a resilient disc or insert embedded in the stopper during the molding operation, said insert having a central opening with radiating slits extending from said opening, and the molded body being formed with a cavity extending only to its upper surface through which a ball of a ball chain may be inserted and forced through the central opening in the insert so as to firmly anchor the chain to the stopper and yet eliminate any through openings which might permit leakage.

Another object of this invention is to provide a stopper of the character described including an insert in a molded body serving as an anchor for the chain, said insert being a one-operation metal stamping and comprising a one-piece member which is hence extremely economical to make.

Yet a further object of this invention is to provide an improved stopper of the character described in which the only assembly necessary is between the chain and the stopper.

Yet a further object of this invention is to provide a stopper of the character described so constructed that the chain may be connected to the stopper without the ring or other fastening ordinarily heretofore used.

Yet another object of this invention is to provide a stopper comprising a molded body entirely closed at its underside, and a concave metal insert or disc embedded within the stopper, said insert being formed with a central opening and radial slits extending from the central opening, and a ball chain for attachment to the stopper, the body being formed with a cavity below the center of the insert, and with an opening extending from the insert to the top of the body so that the lowermost ball on the chain may be pushed through the opening in the insert, the construction being such that when the chain is thereafter pulled, the opening in the insert tends to become smaller so as to insure against pulling the chain away from the stopper. With such construction the bead chain, after being assembled by forcing it into the insert provides an assembly which is stronger than the chain itself, that is, in use the chain cannot pull out of the stopper and would break rather than pull out of its assembly.

Still a further object of this invention is to provide a strong, rugged and durable basin plug of the character described which shall be economical to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top perspective view of a stopper embodying the invention provided with an anchoring chain;

Fig. 2 is a top plan view of the stopper with parts broken away and in cross-section;

Fig. 3 is a cross-sectional view taken on line 3—3 of Fig. 2;

Fig. 4 is a perspective view of the metal insert; and

Fig. 5 is a bottom plan view of the stopper.

Referring now in detail to the drawing, 10 designates a stopper embodying the invention. The same comprises a molded body 12 in which is embedded a disc or insert 13, and an anchoring ball chain 15 anchored to the insert. The body 12 may be molded of rubber, synthetic plastic material in any other suitable resilient, compressible material. It is provided with a frusto-conical or tapering outer annular surface 16 decreasing in diameter towards the underside of the body. Extending from the lower end of the conical surface 16 is an annular flat surface 17. At the underside of the body 12 is an annular recess 18 extending up from the bottom of the body. At the underside of the body is also a central downwardly extending dome-shaped portion 19, the lower surface of which is substantially in the plane of the flat annular surface 17. Extending from the upper end of the frusto-conical surface 16 is another frusto-conical surface 20, decreasing in diameter towards the top. Extending from the upper end of surface 20 is a substantially shallow conical surface 21 forming a depression or concavity in the top of the body.

The body 12 is formed with a central blind opening 22 extending downwardly from the center of surface 21. The opening 22 extends down into the hemispherical portion 19 but does not go all the way through so that the bottom of the stopper is completely closed and imperforate. The body is also formed with a conical chamber 25 which is concave as shown in Fig. 2 of the drawing. The chamber 25 increases in diameter towards its upper end. Its lower end is substantially centrally located with respect to the opening 22 so that said opening 22 extends above as well as below the center of the chamber 25. Embedded within the chamber 25 is the metal disc or platter 13. The disc 13 may be made of resilient metal and is concave and conical in shape and fits within the chamber 25. Thus, the platter or disc 13 is smaller at its lower end and increases in diameter towards its upper end. The disc 13 is formed with a central opening 30 and with a plurality of radial slits 31 radiating from the opening 30. It will be noted that the opening 30 registers with opening 22 and is substantially of the same diameter.

The chain 15 comprises series of balls 35 interconnected by constricted neck portions 36. The lowermost ball 35 is pushed through the central opening 30 in the disc 13 into the lower end of opening 22. It will be noted that the diameter of the ball 35 is somewhat greater than the diameter of opening 30, so that after the end ball of the chain has been forced through the opening 30, an upward pull on the chain will merely tend to reduce the diameter of opening 30 and prevent the ball from becoming disassembled with respect to the plug.

It will now be understood that the insert may be fabricated at lower cost, being a one operation stamping and also being of one piece.

Furthermore, the assembly of parts other than the chain to the insert 13, is eliminated.

The use of a ring or other fastening ordinarily employed in connection with a chain as previously known is eliminated. When the bead chain is assembled by forcing it into the insert, the assembly is stronger than the chain itself. In other words, in use the chain cannot pull out of the stopper and would break rather than pull from its assembly. The stopper is completely leakproof, being solid in this respect. This is in comparison to a bead chain stopper, wherein a body is formed with a central through opening. Such through openings cause leaks which are eliminated with the present construction. The insert may be made of brass or other suitable, preferably resilient material. It will be noted that the neck 36 interconnecting the last two balls of the chain passes through the openings 30 in the insert 13.

If a bead chain should break, the neck 36 adjacent the ball which has been forced through the insert may be clipped. A new chain can then be forced into the stopper assembly quite easily since there may be room provided for two beads in the opening 22 within the stopper below the insert. The new chain can be forced into the stopper by the use of a pencil or similar object. The chain is forced into the stopper after the molding of the assembly and this can be done easily as comparatively little force is required to force the end bead of the chain through the central opening of the insert.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A stopper comprising a body of compressible material, said stopper being formed with a central opening extending down from the upper side but terminating short of the underside of the body, an insert within said stopper, said opening in the body extending below said insert, said insert being formed with a central opening and slots radiating from said opening, the opening in the insert registering with the opening in the body.

2. A stopper comprising a body of compressible material, said stopper being formed with a central opening extending down from the upper side but terminating short of the underside of the body, an insert within said stopper, said opening in the body extending below said insert, said insert being formed with a central opening and slots radiating from said opening, the opening in the insert registering with the opening in the body, and a ball chain comprising a ball within the bottom of said opening and contacting the underside of said insert, and a neck of the chain passing through the opening in the insert.

3. A stopper comprising a body of compressible material, said stopper being formed with a central opening extending down from the upper side but terminating short of the underside of the body, an insert within said stopper, said opening in the body extending below said insert, said insert being formed with a central opening and slots radiating from said opening, the opening in the insert registering with the opening in the body, a ball chain comprising a ball within the bottom of said opening and contacting the underside of said insert, and a neck of the chain passing through the opening in the insert, said insert being concave and increasing in diameter upwardly.

4. A stopper comprising a body of compressible material, said stopper being formed with a central opening extending down from the upper side but terminating short of the underside of the body, an insert within said stopper, said opening in the body extending below said insert, said insert being formed with a central opening and slots radiating from said opening, the opening in the insert registering with the opening in the body, a ball chain comprising a ball within the bottom of said opening and contacting the underside of said insert, a neck of the chain passing through the opening in the insert, said insert being concave and increasing in diameter upwardly, said body being formed at its underside with an annular recess, and a central bump extending below the opening in said body.

5. A stopper of the character described comprising a body of compressible material, an insert embedded within said body, said body and insert being formed with registering openings, and an anchoring member extending through said openings and including a part disposed below the insert and adapted to engage below the edge of the opening in said insert, said insert being concave upwardly, said insert being formed with slots radiating from the opening therein.

6. A stopper of the character described comprising a body of compressible material, an insert embedded within said body, said body and insert being formed with registering openings, and an anchoring member extending through said openings and including a part disposed below the insert and adapted to engage below the edge of the opening in said insert, said insert being concave upwardly, said insert being formed with slots radiating from the opening therein, and said body being imperforate at its underside.

GEORGE A. RILEY.

REFERENCES CITED

The following references are of record in the file of this patent:

UNITED STATES PATENTS

| Number | Name | Date |
| --- | --- | --- |
| 963,060 | Noppel | July 5, 1910 |
| 1,187,221 | Youdelman | June 13, 1916 |
| 2,194,940 | Hiertz | Mar. 26, 1940 |
| 2,226,464 | Gora | Dec. 24, 1940 |